(12) United States Patent
Fredriksson (10) Patent No.: US 9,638,567 B2
(45) Date of Patent: May 2, 2017

(54) RADAR LEVEL GAUGE WITH FOLDABLE PROBE

(71) Applicant: Rosemount Tank Radar AB, Gothenburg (SE)

(72) Inventor: Hakan Fredriksson, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 367 days.

(21) Appl. No.: 14/513,399

(22) Filed: Oct. 14, 2014

(65) Prior Publication Data

US 2016/0103007 A1    Apr. 14, 2016

(51) Int. Cl.
*G01F 23/284* (2006.01)
*G01S 7/02* (2006.01)

(52) U.S. Cl.
CPC .............. *G01F 23/284* (2013.01); *G01S 7/02* (2013.01)

(58) Field of Classification Search
CPC ................................. G01F 23/284; G01S 7/02
See application file for complete search history.

(56) References Cited

U.S. PATENT DOCUMENTS

| 6,859,166 | B2 * | 2/2005 | Edvardsson | .......... G01F 23/284 342/124 |
| 7,159,458 | B2 | 1/2007 | Reimelt et al. | |
| 7,908,920 | B2 * | 3/2011 | Champion | ............ G01F 23/284 73/304 C |
| 2003/0201842 | A1 | 10/2003 | Gard | |
| 2005/0057264 | A1 | 3/2005 | Klofer | |
| 2015/0070206 | A1 | 3/2015 | Hagglund | |
| 2016/0320225 | A1 * | 11/2016 | Welle | .................... G01F 23/284 |

FOREIGN PATENT DOCUMENTS

| CN | 203758577 | 8/2014 |
| EP | 2 199 763 | 6/2010 |
| FR | 56 249 | 9/1952 |

OTHER PUBLICATIONS

European Search Report from EP Application No. 15185856.0, dated May 23, 2016.

* cited by examiner

*Primary Examiner* — Matthew M Barker
(74) *Attorney, Agent, or Firm* — Westman, Champlin & Koehler, P.A.

(57) ABSTRACT

The present invention relates to a guided wave radar level gauge for determining a filling level of a product contained in a tank, said guided wave radar level gauge i.a. comprising a probe comprising a plurality of elongate probe sections each being pivotably connected to an adjacent probe section by means of a joint, said joint allowing probe sections to pivot between an operating state where said probe sections are substantially aligned along a straight line, and a transporting state. The present invention also relates to a probe, and to a method for arranging a guided wave radar level gauge in a tank.

17 Claims, 7 Drawing Sheets

Fig. 5D

RADAR LEVEL GAUGE WITH FOLDABLE PROBE

FIELD OF THE INVENTION

The present invention relates to a guided wave radar level gauge for determining a filling level of a product contained in a tank. The present invention further relates to a probe, and a method for arranging a guided wave radar level gauge in a tank.

TECHNICAL BACKGROUND

Microwave level gauge, or radar level gauges (RLGs), are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a guided wave transmission line.

In a GWR system, a probe is generally arranged to extend vertically from the top of the tank towards the bottom of the tank. Probes for GWR level gauge systems are typically provided in the form of wire probes or rigid probes. A wire probe may comprise a metallic wire having a diameter between a few mm up to tens of millimeters. Rigid probes often have a larger diameter.

In RLGs used in large tanks, such as tanks for liquid natural gas (LNG) which may be around 30 m high, wire probes are often used due to the ease of installation. Installation of a wire probe may comprise attaching a weight to the bottom of the probe and simply lowering the probe into the tank.

However, for certain applications it may be desirable, or even necessary, to use a rigid probe. A rigid probe is typically more robust and thereby more resistant against both mechanical wear and tear as well as chemical exposure. As is readily realized, a conventional rigid probe for use in large tanks formed in one piece can be difficult to both transport and install.

Furthermore, the varying size of tanks for different applications means that a level gauge system must be provided with a probe where the length is either tailor made for the specific tank, or where the length may be adjusted during installation.

To overcome the problems associated with using rigid probes in large tanks, U.S. Pat. No. 7,159,458 discloses a measuring device for determining the filling level of a product or the position of the interface between two media or phases in a container by means of high-frequency measuring signals which are guided along a waveguide. The waveguide comprises a wire cable with a plurality of individual wires of a predetermined diameter which are twisted together. U.S. Pat. No. 7,159,458 further discloses that the waveguide may comprise a plurality of pieces connected to each other via a flexible intermediate piece. The pieces may be tubes or rods, and the flexible piece may be a wire cable or universal joint.

However, the probe disclosed by U.S. Pat. No. 7,159,458 does not provide the possibility of reducing the amount of space required during transport of the probe and further may not provide a probe with the required rigidity for some applications.

SUMMARY OF THE INVENTION

In view of the above-mentioned, a general object of the present invention is to provide a guided wave radar level gauge having an improved rigid probe, facilitating transport and installation.

According to a first aspect of the present invention, there is provided a guided wave radar level gauge for determining a filling level of a product contained in a tank, said guided wave radar level gauge comprises: a transceiver for transmitting electromagnetic transmission signals and receiving electromagnetic return signals reflected at a surface of said product; a tank feed through structure proving a sealed electrical connection through a wall of said tank; processing circuitry connected to said transceiver and configured to determine said filing level based on a relationship between said electromagnetic transmission signals and said electromagnetic return signals; and a probe, mechanically connected to said tank feed through structure, arranged to extend vertically into said tank and configured to guide said electromagnetic transmission signals towards said surface and to guide said reflected electromagnetic signals back to said transceiver; said probe comprising a plurality of elongate probe sections, one of said elongate probe sections being mechanically connected to said tank feedthrough structure, and each probe section being pivotably connected to an adjacent probe section by means of a joint, said joint allowing probe sections to pivot between an operating state where said probe sections are substantially aligned along a straight line, and a transporting state, wherein said joint comprises a link member, which link member is pivotally connected to a first revolute joint member provided at an end of a first probe section and to a second revolute joint member provided at an end of a second probe section adjacent to the first probe section.

A probe comprising several pivotably connected probe sections can be delivered in the transporting state, i.e. as a probe folded neatly together, thereby taking less space during transport and delivery. Further, the risk for damage to the probe during transport is reduced, as is the need for large amounts of packaging. During installation the probe sections can easily be arranged into the operating state even in small spaces. Since the probe sections are also connected in the transport state there is also a reduced risk for any probe sections being misplaced, or being incorrectly mounted. Moreover, the length of the probe can adjusted by adding or removing probe sections. Further, according to embodiments of the invention, the probe may be installed without any special tools for the purpose of arranging the probe in the operating state. Furthermore, the joint with a link member and two revolute joint members provides a simple and low cost mechanical design that allows rotation of the probe sections of 180 degrees relative each other in a single plane. One specific way to enable such rotation is to select a distance between pivoting axes of the revolute joint members to be at least the diameter of the probe sections.

In the transporting state, the probe sections may be aligned along each other and substantially parallel to each other. By connecting the sections with a joint allowing the sections to be aligned along each other on parallel axes, the probe may be folded together in a transport state to take up significantly less space and still be easy install.

Each joint may further comprise a locking sleeve arranged to cover adjacent ends of probe sections connected by said joint, thereby locking said probe sections in said operating state. The additional rigidity provided by the sleeve can ensure that the probe stays rigid even in a turbulent product.

Each joint may also comprise a retaining element arranged in a receiving hole of the probe section, a protruding end of said retaining element being adapted to abut said locking sleeve such that the sleeve is prevented from moving longitudinally along the probe when in the operating state.

A first end portion of a probe section may be reduced and configured to receive the sleeve in the operating state, and a second end portion of an adjacent probe section, which second end portion is opposite the first end portion, may be reduced and configured to hold the sleeve in the transporting state. The first and second end portions may for example have a smaller diameter than remaining portions of the probe sections. The reduced portions may for example be achieved by machining the probe sections. A stepwise increase in diameter along the length of the probe may introduce spurious echoes from the change in impedance. Therefore, the depth of the reduced portions preferably matches the thickness of the sleeve. The reduced sections together with the addition of the sleeve will enable the probe to have a substantially uniform diameter in order to reduce the amount of noise or spurious echoes which appear due to attenuation for the electromagnetic signals. The diameter of the probe may be 13 mm or less. The sleeve may have a thickness less than 2 mm and preferably less than 1 mm.

According to a second aspect of the present invention, there is provided a probe for a guided wave radar level gauge, wherein the probe is configured to guide electromagnetic signals, said probe comprising a plurality of elongate probe sections, one of said elongate probe sections being adapted to be mechanically connected to a tank feedthrough structure, and each probe section being pivotably connected to an adjacent probe section by means of a joint, said joint allowing probe sections to pivot between an operating state where said probe sections are substantially aligned along a straight line, and a transporting state, wherein said joint comprises a link member, which link member is pivotally connected to a first revolute joint member provided at an end of a first probe section and to a second revolute joint member provided at an end of a second probe section adjacent to the first probe section. The probe sections are preferably electrically conductive, in order to guide electromagnetic signals. The one elongate probe section adapted to be mechanically connected to a tank feedthrough structure may have a threaded portion. This aspect of the invention may exhibit the same or similar features and technical effects as the first aspect.

According to a third aspect of the present invention, there is provided a method for arranging a guided wave radar level gauge in a tank, wherein the guided wave radar level gauge comprises: a transceiver for transmitting electromagnetic transmission signals and receiving electromagnetic return signals; a tank feed through structure proving a electrical connection through a wall of said tank; processing circuitry connected to said transceiver; and a probe comprising a plurality of elongate probe sections, each probe section being pivotably connected to an adjacent probe section by means of a joint, said joint allowing probe sections to pivot between an operating state where said probe sections are substantially aligned along a straight line, and a transporting state where said probe sections are aligned along each other and substantially parallel to each other, wherein the method comprises: unfolding the probe from the transporting state to the operating state by pivoting the probe sections relative each other; and arranging the unfolded probe in the tank, wherein the probe is arranged to extend vertically into said tank and configured to guide said electromagnetic transmission signals towards said surface and to guide said reflected electromagnetic signals back to said transceiver. This aspect of the invention may exhibit the same or similar features and technical effects as the first and second aspects.

Arranging the unfolded probe in the tank may comprise: mechanically connecting said one elongate probe section to said tank feedthrough structure; and electrically connecting the probe to said transceiver.

Said joint may further comprise a locking sleeve, wherein the method further comprises: moving the locking sleeve so that it covers said joint, thereby locking said probe sections in said operating state.

The method may further comprise, after moving the locking sleeve so that it covers said joint, arranging a retaining element in a receiving hole of said probe section, wherein a protruding end of said retaining element is adapted to abut said locking sleeve such that said locking sleeve is prevented from moving longitudinally along said probe when the probe is in the operating state.

The joint may comprise a link member, which link member is pivotally connected to a first revolute joint member provided at an end of a first probe section and to a second revolute joint member provided at an end of a second probe section adjacent to the first probe section.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS OF THE INVENTION

In the present detailed description, various embodiments of a guided wave radar level gauge and a method according to the present invention are mainly discussed with reference to a guided wave radar level gauge using a probe comprising a relatively low number of probe sections. In use, the number of probe sections will be decided by each application. Thereby it should be understood that a large tank requiring a longer probe will have a probe with a larger number of probe sections, or probe sections which are longer. In the following description like reference number will refer to like elements throughout.

Figure 1:
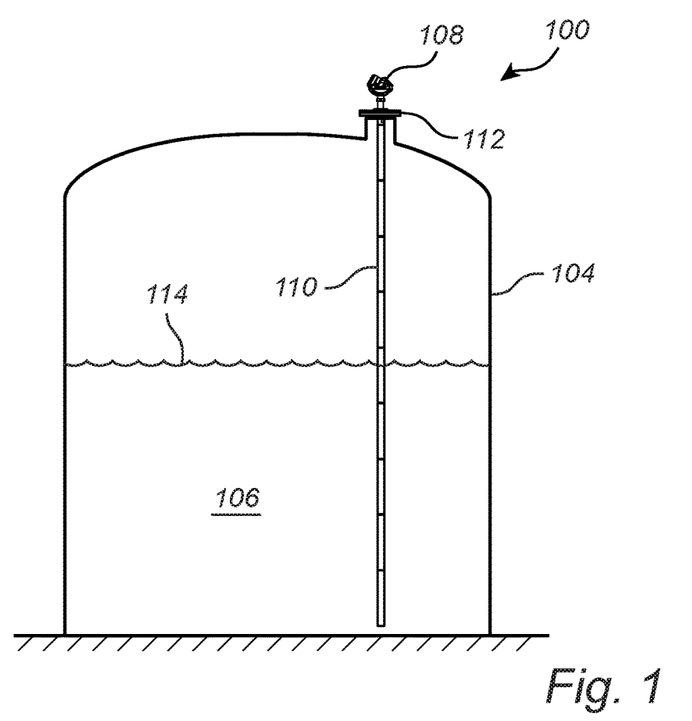
FIG. 1 schematically illustrates a guided wave radar level gauge according to an embodiment of the invention.

FIG. 1 is a schematic illustration of a guided wave radar level gauge 100 for detecting the filling level of a product 106 in a tank 104. The radar level gauge 100 comprises a measurement unit 108 mounted on the roof of the tank 104 and a probe 110 extending into the tank 104. The radar level gauge further comprises a tank feed through structure 112, also referred to as a tank seal. The purpose of the tank feed through structure 112 is to provide a sealed electrical connection through the tank roof, thereby enabling electrical contact between the measurement unit 108 and the probe 110.

The measurement unit 108 comprises a transceiver and processing circuitry (not shown) for generating transmitting and receiving electromagnetic signals and for determining a filing level based on received reflected signals. In general, the filling level can be determined by transmitting an electromagnetic signal which propagates along the probe 110 and is at least partially reflected at the surface 114 of the product. The tank 104 can be any container or vessel capable of containing a product, and may be metallic, or partly or completely non-metallic, open, semi-open, or closed. The electromagnetic transmission signals typically comprise frequencies from 1-2 GHz.

Figure 2A:
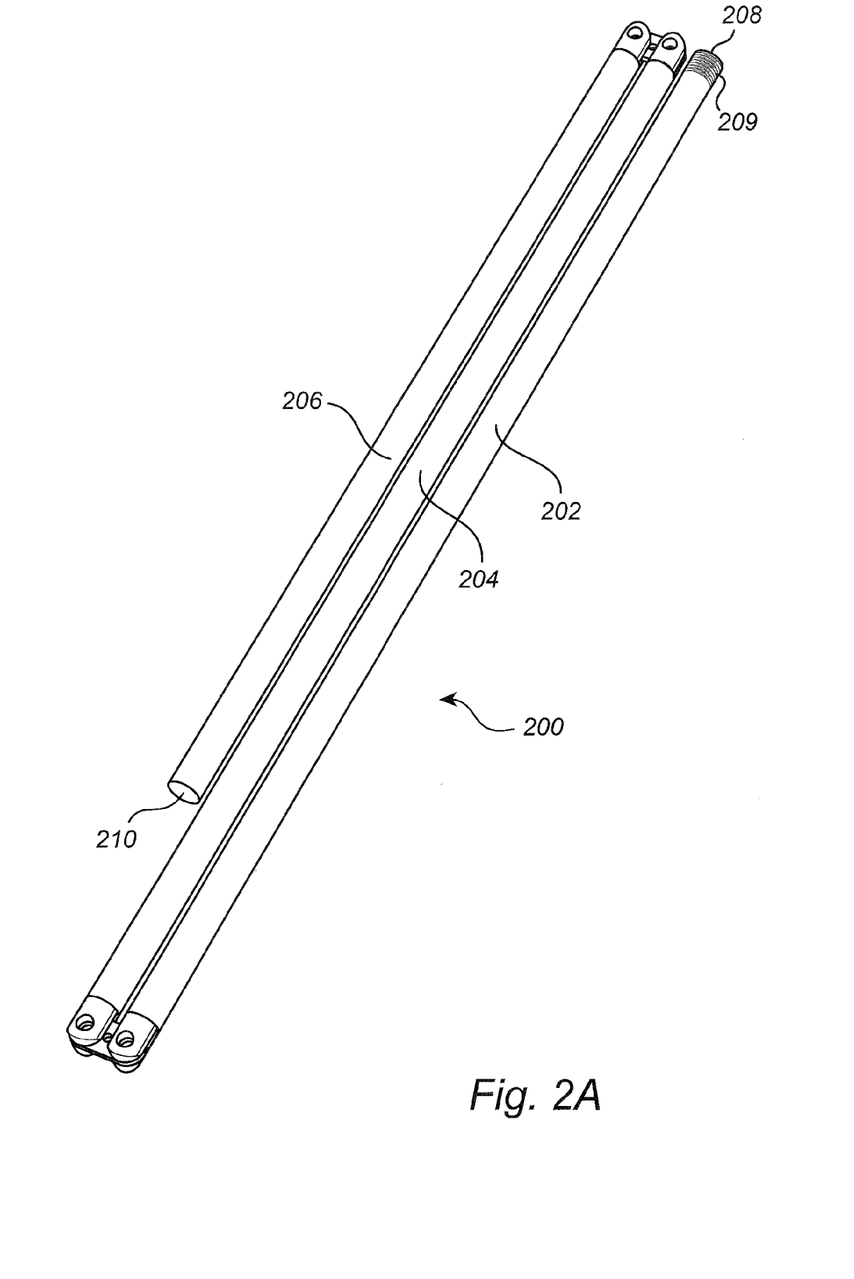
FIGS. 2A-C are schematic illustrations of a guided wave radar level gauge probe according to an embodiment of the invention.
Figure 2B:
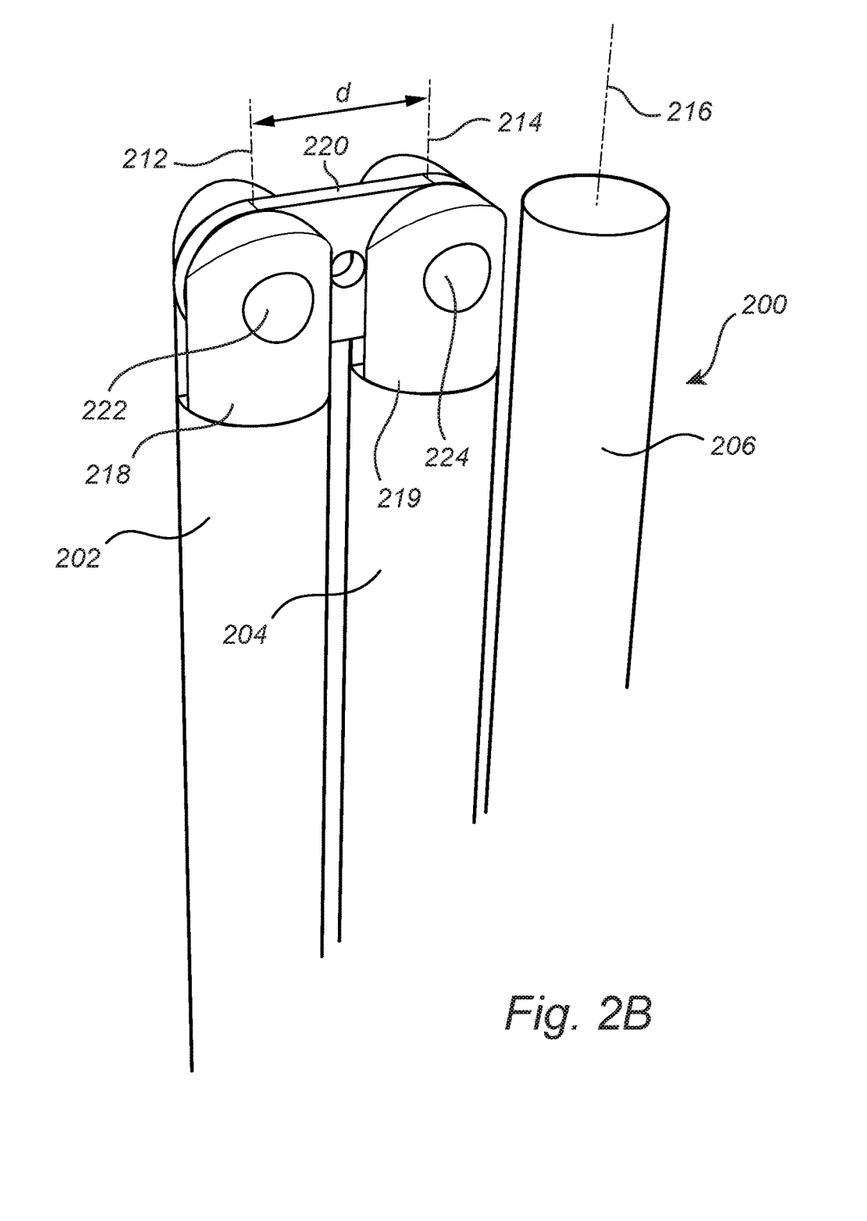
Figure 2C:
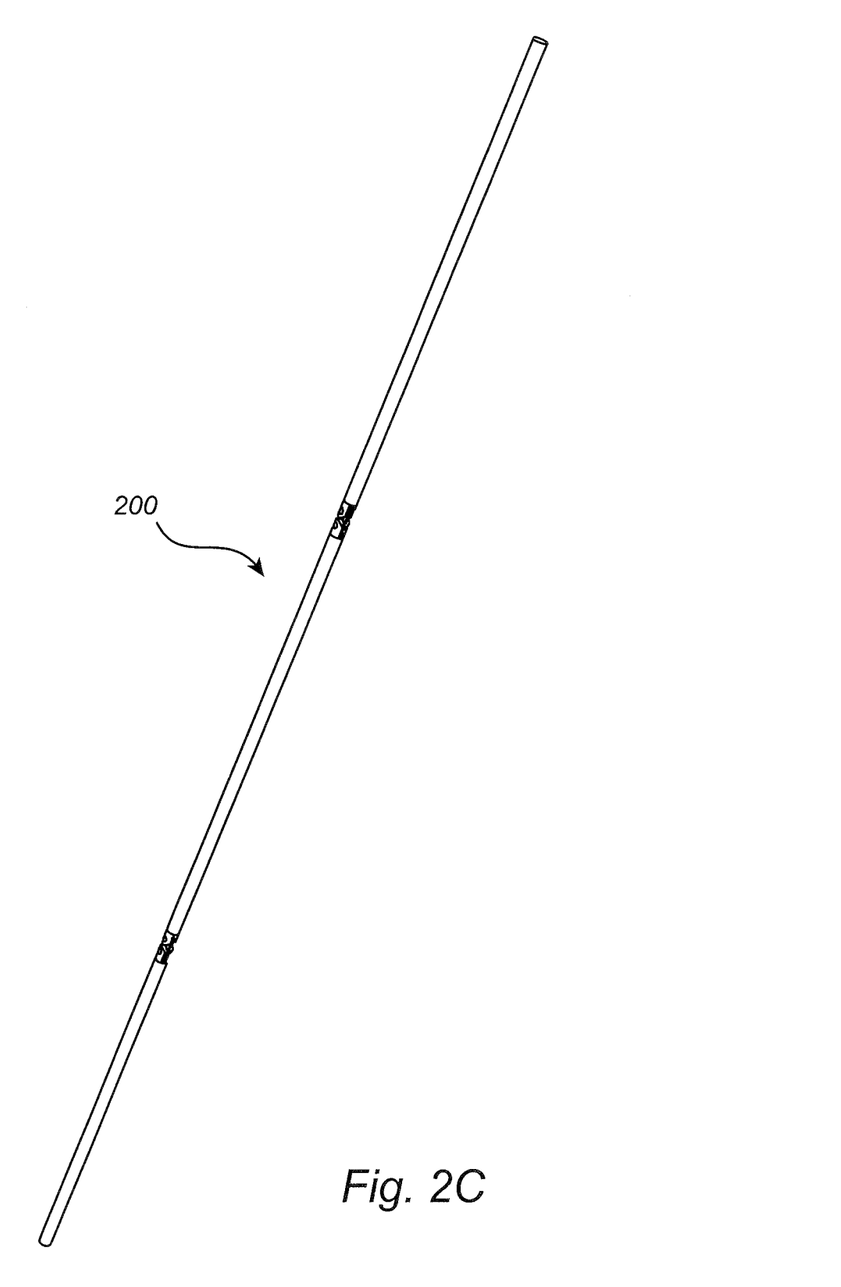

FIGS. 2A, 2B and 2C illustrate an exemplary embodiment of a probe 200 comprising a plurality of probe sections 202, 204, 206. FIGS. 2A and 2B show the probe 200 in a transporting state, and FIG. 2C shows the probe 200 in an operating state.

In FIGS. 2A and 2B, the three probe sections 202, 204, 206 are folded to be positioned along each other (side by side). The probe sections 202, 204, 206 are aligned along three parallel axes 212, 214, 216 (FIG. 2B). Note that the parallel axes 212, 214, 216 are parallel but separated by a distance. The probe sections 202, 204, 206 are generally understood to be elongate with a circular symmetric cross section. The length of the probe sections 202, 204, 206 may for example be 1 meter, and the overall length of the probe 200 may for example be up to 10 meters, hence resulting in up to ten connected probe sections.

FIG. 2B shows in more detail how the sections 202 and 204 are connected to each other by a joint 218, 219, 220. The joint comprises a link member 220 connected to a revolute joint member 218 in an end of section 202 and to a revolute joint member 219 in an end of section 204. The link member 220 is connected to the revolute joint member 218 by means of a first pin 222 and to the revolute joint member 219 by means of a second pin 224. The first and second pins 222, 224 may for example be riveted. The first pin 222 corresponds to a first pivoting axis, and the second pin 224 corresponds to a second pivoting axis. The first and second pivoting axes are parallel. The link member 220 and the revolute joint members 218, 219 with the pins 222, 224 may together be referred to as a "double revolute joint". The distance d between the two axes/pins 222, 224, as for example governed by the length of the link member 220, is sufficiently large to allow the probe sections 202, 204 to be folded along the parallel axes 212, 214. In the illustrated example, with the revolute joint members 218, 219 located along the center axis of the probe sections 202, 204, this means that the distance d should be at least equal to the diameter of the probe sections. A maximum distance d may for example be 105%-120% of the probe section diameter, for instance 110% (i.e. d=probe section diameter*1.1). The maximum distance d may alternatively be 1-2.5% of the probe section length, for example. A similar mechanism connects the second probe section 204 and third probe section 206 (not shown in FIG. 2B).

Returning to FIG. 2A, the first probe section 202 has an end portion 208 that comprises a connector with an outside or inside threaded portion 209 for connection to the tank feed through structure 112. The third probe section 206 has an end portion 210 without a revolute joint. To efficiently produce the probe sections, the probe section 206 can be similar to the first probe section 202, e.g. comprising a connecting end 208. It should be noted that the third probe section 206 equally well could comprise an end portion with a revolute joint.

In FIG. 2C the probe 200 is shown in the operating state with the probe sections 202, 204, 206 substantially aligned in a straight line, i.e. along a single axis. The probe sections 202, 204, 206 and thus the probe 200 preferably have a substantially uniform diameter. The diameter of a probe section may be in the range of 10 to 20 mm, such as for example 13 mm, approximately equal to 0.5 inches. By using a probe 200 having a uniform diameter, the probe 200 can provide uniform propagation properties over the length of the probe 200 which is desirable for accurate filling level determination, as a varying diameter, and in particular a stepwise varying diameter, may result in spurious echo signals.

The probe sections 202, 204, 206 and the revolute joint members 218, 219 may be made from one and the same piece of material for example by machining the end portion of an elongate cylinder. The cylinder is preferably made from a material suitable for guiding electromagnetic waves, such as for example stainless steel or other metal alloys. It may be desirable to provide the probe 200 in a material which is resistant to corrosion, such as stainless steel. However, it is also possible to manufacture the revolute joint members 218, 219 and the probe sections 202, 204, 206 separately and thereafter permanently attach the two pieces together, for example by welding.

Figure 3A:
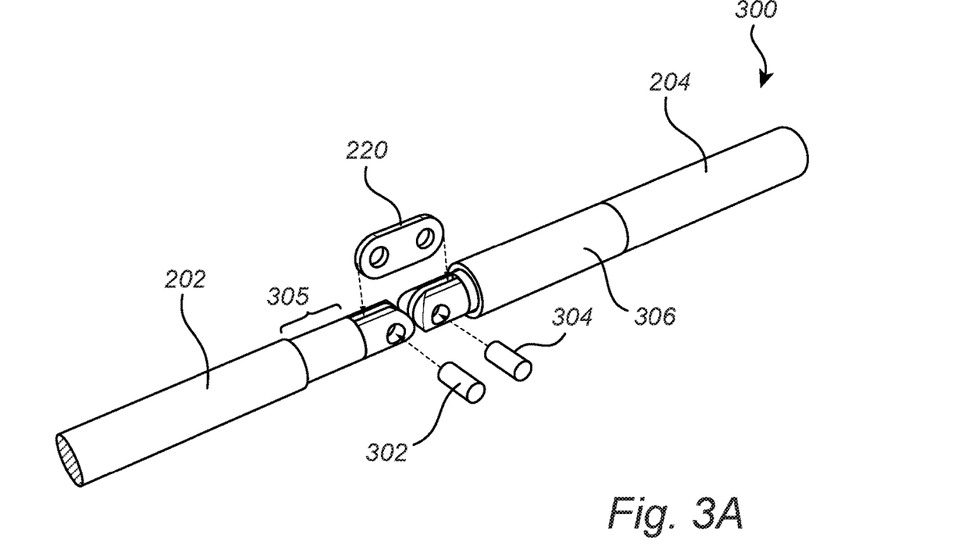
FIGS. 3A-B are schematic illustrations of a joint in a probe for a guided wave radar level gauge according to an embodiment of the invention.
Figure 3B:
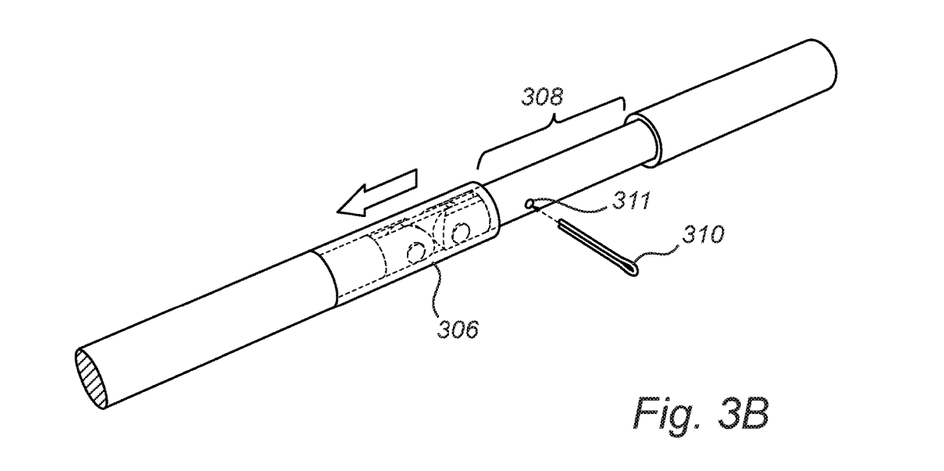

FIGS. 3A and 3B schematically illustrate another embodiment of a joint for connecting two probe sections 202, 204.

Similar to the joint in FIG. 2B, the joint in FIGS. 3A-3B comprises a link member 220 which is secured to each probe section via a revolute joint. In the illustrated example, the link member 220 exhibits two through holes, and the revolute joint members of the probe sections 202 and 204 each have similar through holes facing each other. The "double revolute joint" is here formed by inserting a first pin 302 into the hole of the revolute joint member of probe section 202 and a first hole in the link member 220, and a second pin 304 into the hole of the revolute joint member of probe section 204 and a second hole in the link member 220. This type of revolute joint can also be described as a pin joint or hinge joint.

The joint further comprises a sleeve 306 surrounding the probe 300. The probe sections 202, 204 each have end portions 305, 308 with reduced diameter, configured to receive the sleeve. In other words, the probe sections are stepped at the end portions. The end portions 305, 308 may for example be cylinder-shaped. The sleeve 306 here has a small thickness such as up to 2 mm and preferably 1 mm or less, and an outer diameter substantially equal to the outer diameter of other portions of the probe sections 202, 204. In FIG. 3A, the sleeve 306 is located at the end portion 308 of probe section 202, separate from the link member 220. In FIG. 3B, the sleeve 306 has been slid longitudinally along the probe 300 in the direction indicated by the arrow, so as to be located over the link member 220 and partially extending over each reduced portion 305, 308. In this position, the sleeve 306 fixes the probe sections 202, 204 and prevents rotation. A person skilled in the art realizes that other means for locking the probe in the operating conditions are possible.

In use, the probe 300 is preferably arranged such that the direction indicated by the arrow corresponds to the direction of gravity, thereby "discouraging" the sleeve 306 to slide back to the end portion 308. However, to (further) secure the sleeve 306, a retaining element, here in the form of a split pin 310, may be inserted through a receiving hole 311 in the first probe section 202. The receiving hole 311 is located at such a distance from the link member 220 that the sleeve 306 may be slid past the hole 311. Once the split pin 310 has been inserted in hole 311, the sleeve 306 will not be able to move away from the joint as movement is blocked by the split pin 310. The split pin 310, as well as other types of retaining elements, is preferably formed from a material which is resistant to corrosion, such as stainless steel, or other alloys or metals having similar properties.

The reduced portions 305, 308 can be provided by machining the end portions of a probe section. As mentioned, the reduced portions may be matched with the thickness of the sleeve 306 in order to reduce the stepwise transition of the diameter. Further, the diameter change between the reduced portion 305, 308 and remaining portions of the probe sections 202, 204 can be provided with a number of steps, or a slope in order to reduce the abrupt change in diameter.

Figure 4A:
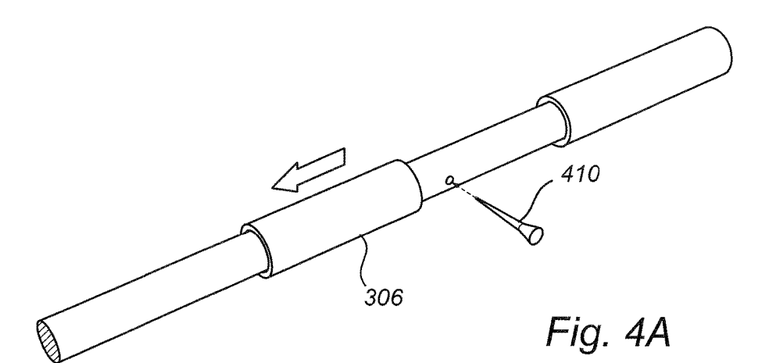
FIGS. 4A-C illustrate a method according to an embodiment of the invention.
Figure 4B:
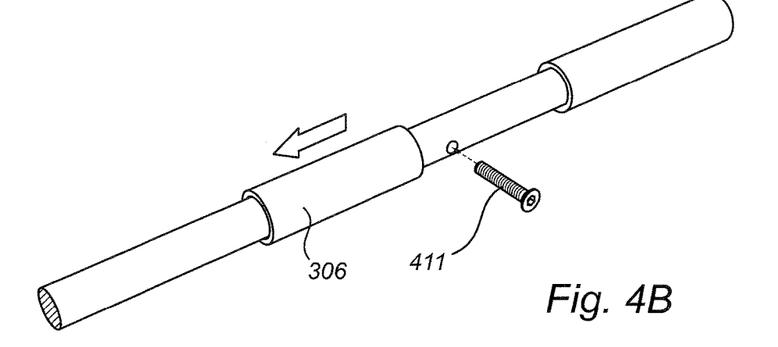
Figure 4C:
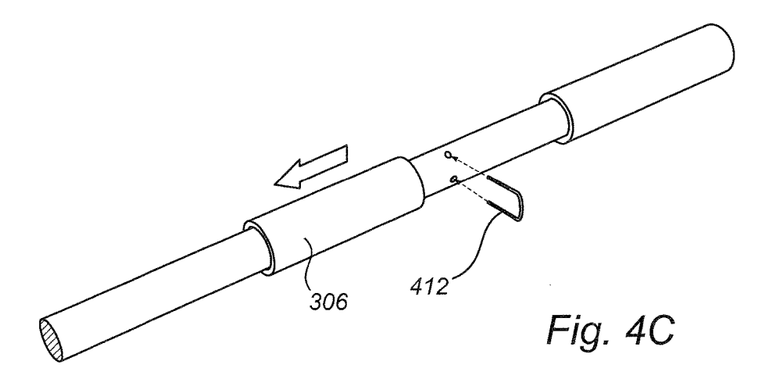

In FIG. 4A, a tapered locking pin 410 is illustrated, FIG. 4B shows a threaded locking pin 411, i.e. a screw, and FIG. 4C shows a u-shaped locking pin 412, the ends of which pin can be bent to secure the locking pin 410 to the probe. It should be noted that each of the locking pins illustrated in FIGS. 4A-C may be used together with the joint-sleeve illustrated in FIGS. 3A-B. Furthermore, the person skilled in the art readily realizes that variations based on the illustrated examples may equally well be used.

FIGS. 5A-D schematically illustrates a method for arranging a guided wave radar level gauge in a tank.

Figures 5A, 5B, 5C, 5D:
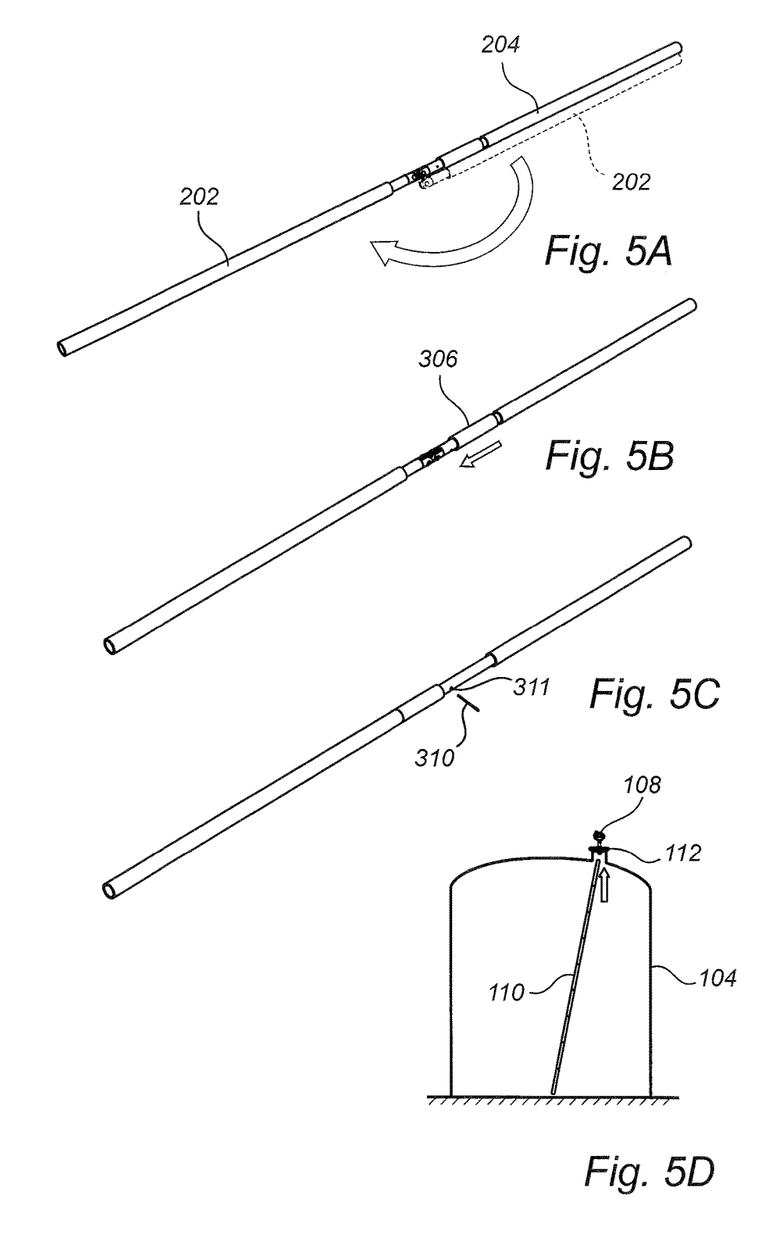
FIGS. 5A-D schematically illustrate a method for arranging a guided wave radar level gauge in a tank.

In the first step S1, illustrated in FIG. 5A, a first probe section 202 is unfolded from the probe 110 in transporting state. The unfolding may be performed manually by an operator, either by hand or with the use of a tool if required. As is easily understood each probe section is unfolded to form a probe in operating state.

In the next step, S2, as illustrated in FIG. 5B, the sleeve 306 is moved longitudinally along the probe 110 to cover and lock the joint.

Next, in FIG. 5C, a retaining element, here illustrated in the form of a split pin 310 is inserted into the receiving hole 311 to ensure that the sleeve does not move along the probe.

Finally, in figure, the probe 110 is arranged in the tank 104 and electrically connected to the transceiver. When the probe is to be used in a closed tank, electrical and mechanical connection may be achieved using a tank feedthrough 112 structure. The probe 110 may be mechanically connected to the tank feedthrough structure 112 for example by engaging threads on the tank feedthrough structure 112 with internal or external threads provided on a first end of a probe section.

Even though the invention has been described with reference to specific exemplifying embodiments thereof, many different alterations, modifications and the like will become apparent for those skilled in the art. For example, the precise geometry of the revolute joints and sleeve may vary, while still being able to provide the intended functionality and mechanical stability. Also, it should be noted that parts of the system may be omitted, interchanged or arranged in various ways, the guided wave radar level gauge yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A guided wave radar level gauge for determining a filling level of a product contained in a tank, said guided wave radar level gauge comprises:
    a transceiver for transmitting electromagnetic transmission signals and receiving electromagnetic return signals reflected at a surface of said product;
    a tank feed through structure proving a electrical connection through a wall of said tank;
    processing circuitry connected to said transceiver and configured to determine said filing level based on a relationship between said electromagnetic transmission signals and said electromagnetic return signals; and
    a probe, mechanically connected to said tank feed through structure, arranged to extend vertically into said tank and configured to guide said electromagnetic transmission signals towards said surface and to guide said reflected electromagnetic signals back to said transceiver;
    said probe comprising a plurality of elongate probe sections, one of said elongate probe sections being mechanically connected to said tank feedthrough structure, and each probe section being pivotably connected to an adjacent probe section by means of a joint, said joint allowing probe sections to pivot between an operating state where said probe sections are substantially aligned along a straight line, and a transporting state, wherein said joint comprises a link member, which link member is pivotally connected to a first revolute joint member provided at an end of a first probe section and to a second revolute joint member provided at an end of a second probe section adjacent to the first probe section.

2. The guided wave radar level gauge according to claim 1, wherein said probe sections in said transporting state are aligned along each other and substantially parallel to each other.

3. The guided wave radar level gauge according to claim 1, wherein the probe sections have a diameter, and wherein a distance between pivoting axes of said revolute joint members corresponds to at least the diameter of the probe sections.

4. The guided wave radar level gauge according to claim 1, wherein said joint further comprises a locking sleeve arranged to cover adjacent ends of probe sections connected by said joint, thereby locking said probe sections in said operating state.

5. The guided wave radar level gauge according to claim 4, wherein said joint further comprises a retaining element arranged in a receiving hole of said probe section, a protruding end of said retaining element being adapted to abut said locking sleeve such that said locking sleeve is prevented from moving longitudinally along said probe when the probe is in the operating state.

6. The guided wave radar level gauge according to claim 4, wherein a first end portion of a probe section is reduced and configured to receive the sleeve in said operating state, and a second end portion of an adjacent probe section, which second end portion is opposite said first end portion, is reduced and configured to hold said sleeve in said transporting state.

7. A probe for a guided wave radar level gauge, said probe comprising a plurality of elongate probe sections, one of said elongate probe sections being adapted to be mechanically connected to a tank feedthrough structure, said probe being configured to guide electromagnetic transmission signals from a transceiver towards a surface of a product in said tank and to guide reflected electromagnetic signals back to said transceiver, each probe section being pivotably connected to an adjacent probe section by means of a joint, said joint allowing probe sections to pivot between an operating state where said probe sections are substantially aligned along a straight line, and a transporting state, wherein said joint comprises a link member, which link member is pivotally connected to a first revolute joint member provided at an end of a first probe section and to a second revolute joint member provided at an end of a second probe section adjacent to the first probe section.

8. The probe according to claim 7, wherein said probe sections in said transporting state are aligned along each other and substantially parallel to each other.

9. The probe according to claim 8, wherein the probe sections have a diameter, and wherein a distance between pivoting axes of said revolute joint members corresponds to at least the diameter of the probe sections.

10. The probe according to claim 7, wherein said joint further comprises a locking sleeve arranged to cover adjacent ends of probe sections connected by said joint, thereby locking said probe sections in said operating state.

11. The probe according to claim 10, wherein said joint further comprises a retaining element arranged in a receiving hole of said probe section, a protruding end of said retaining element being adapted to abut said locking sleeve such that said locking sleeve is prevented from moving longitudinally along said probe when the probe is in the operating state.

12. The probe according to claim 10, wherein a first end portion of a probe section is reduced and configured to receive the sleeve in said operating state, and a second end portion of an adjacent probe section, which second end portion is opposite said first end portion, is reduced and configured to hold said sleeve in said transporting state.

13. A method for arranging a guided wave radar level gauge in a tank, wherein the guided wave radar level gauge comprises:
a transceiver for transmitting electromagnetic transmission signals and receiving electromagnetic return signals;
a tank feed through structure proving a sealed electrical connection through a wall of said tank;
processing circuitry connected to said transceiver; and
a probe comprising a plurality of elongate probe sections, each probe section being pivotably connected to an adjacent probe section by means of a joint, said joint allowing probe sections to pivot between an operating state where said probe sections are substantially aligned along a straight line, and a transporting state where said probe sections are aligned along each other and substantially parallel to each other,
wherein the method comprises:
unfolding the probe from the transporting state to the operating state by pivoting the probe sections relative each other; and
arranging the unfolded probe in the tank, wherein the probe is arranged to extend vertically into said tank and configured to guide said electromagnetic transmission signals towards a surface of a product in said tank and to guide reflected electromagnetic signals back to said transceiver.

14. The method according to claim 13, wherein arranging the unfolded probe in the tank comprises:
mechanically connecting said one elongate probe section to said tank feedthrough structure; and
electrically connecting the probe to said transceiver.

15. The method according to claim 13, wherein said joint further comprises a locking sleeve, and wherein the method further comprises:
moving the locking sleeve so that it covers said joint, thereby locking said probe sections in said operating state.

16. The method according to claim 15, further comprising:
after moving the locking sleeve so that it covers said joint, arranging a retaining element in a receiving hole of said probe section, wherein a protruding end of said retaining element is adapted to abut said locking sleeve such that said locking sleeve is prevented from moving longitudinally along said probe when the probe is in the operating state.

17. The method according to claim 13, wherein said joint comprises a link member, which link member is pivotally connected to a first revolute joint member provided at an end of a first probe section and to a second revolute joint member provided at an end of a second probe section adjacent to the first probe section.

* * * * *